(12) United States Patent  
Feng et al.

(10) Patent No.: US 9,391,014 B2  
(45) Date of Patent: Jul. 12, 2016

(54) PHYSICAL UNCLONABLE INTERCONNECT FUNCTION ARRAY

(71) Applicant: International Business Machines Corporation, Armonk, NY (US)

(72) Inventors: Kai D. Feng, Hopewell Junction, NY (US); Wai-Kin Li, Beacon, NY (US); Ping-Chuan Wang, Hopewell Junction, NY (US); Zhijian Yang, Stormville, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/825,303

(22) Filed: Aug. 13, 2015

(65) Prior Publication Data

US 2015/0348899 A1    Dec. 3, 2015

Related U.S. Application Data

(62) Division of application No. 13/414,825, filed on Mar. 8, 2012.

(51) Int. Cl.
*H01L 23/522* (2006.01)
*H01L 23/528* (2006.01)
(Continued)

(52) U.S. Cl.
CPC .......... *H01L 23/5222* (2013.01); *H01L 23/528* (2013.01); *H01L 23/5226* (2013.01); *H04L 9/3278* (2013.01); *H05K 1/0289* (2013.01); *H04L 2209/12* (2013.01)

(58) Field of Classification Search
CPC ... H05K 1/0289; H05K 1/0286; H04L 9/3278

USPC .................................. 174/260–266; 257/774
See application file for complete search history.

(56) References Cited

U.S. PATENT DOCUMENTS 7,633,346 B2    12/2009    Oishi
7,653,197 B2    1/2010    Van Dijk
(Continued)

FOREIGN PATENT DOCUMENTS

JP    2000307392 A    11/2000
KR    20100021446 A    2/2010

OTHER PUBLICATIONS

B. Gassend et al., "Controlled Physical Random Functions," Proceedings of the 18th Annual Computer Security Applications Conference (ACSAC '02), Copyright 2002 IEEE, pp. 1-12.

(Continued)

*Primary Examiner* — Hoa C Nguyen
*Assistant Examiner* — Amol Patel
(74) *Attorney, Agent, or Firm* — Cantor Colburn LLP; Steven Meyers (57) ABSTRACT

A method for fabricating an interconnect function array includes forming a first plurality of conductive lines on a substrate, forming an insulator layer over the first plurality of conductive lines and the substrate, removing portions of the insulator layer to define cavities in the insulator layer that expose portions of the substrate and the first plurality of conductive lines, wherein the removal of the portions of the insulator layer results in a substantially random arrangement of cavities exposing portions of the substrate and the first plurality of conductive lines, depositing a conductive material in the cavities, and forming a second plurality of conductive lines on portions of the conductive material in the cavities and the insulator layer.

3 Claims, 11 Drawing Sheets

(51) Int. Cl.
*H04L 9/32* (2006.01)
*H05K 1/02* (2006.01)

(56) References Cited

U.S. PATENT DOCUMENTS

| | | | |
|---|---|---|---|
| 8,203,080 B2* | 6/2012 | Vasoya | H05K 3/4608 174/255 |
| 8,525,549 B1 | 9/2013 | Feng et al. | |
| 2007/0038871 A1 | 2/2007 | Kahlman et al. | |
| 2007/0090312 A1 | 4/2007 | Stallinga et al. | |
| 2008/0044027 A1 | 2/2008 | Van Dijk | |
| 2008/0121416 A1* | 5/2008 | Hirai | H05K 3/4614 174/259 |
| 2008/0231418 A1 | 9/2008 | Ophey et al. | |
| 2008/0279373 A1 | 11/2008 | Erhart et al. | |
| 2009/0083833 A1 | 3/2009 | Ziola et al. | |
| 2009/0144534 A1 | 6/2009 | Calhoon et al. | |
| 2009/0153841 A1 | 6/2009 | Ophey et al. | |
| 2010/0122353 A1 | 5/2010 | Koushanfar et al. | |
| 2010/0127822 A1 | 5/2010 | Devadas | |
| 2010/0146261 A1 | 6/2010 | Talstra et al. | |
| 2010/0293384 A1 | 11/2010 | Potkonjak | |
| 2010/0293612 A1 | 11/2010 | Potkonjak | |
| 2010/0322418 A1 | 12/2010 | Potkonjak | |
| 2011/0002461 A1 | 1/2011 | Erhart et al. | |
| 2011/0163088 A1 | 7/2011 | Besling et al. | |
| 2011/0234241 A1 | 9/2011 | Lewis et al. | |
| 2011/0254141 A1 | 10/2011 | Roest et al. | |
| 2011/0317829 A1 | 12/2011 | Ficke et al. | |
| 2012/0030268 A1 | 2/2012 | Liu et al. | |
| 2012/0161850 A1 | 6/2012 | Rangarajan et al. | |
| 2013/0233608 A1 | 9/2013 | Feng et al. | |
| 2015/0207505 A1 | 7/2015 | Feng et al. | |

OTHER PUBLICATIONS

D. Puntin et al., "CMOS Unclonable System for Secure Authentication Based on Device Variability," Copyright 2008 IEEE, pp. 130-133.

International Search Report and Written Opinion of the International Searching Authority, corresponding PCT Application No. PCT/USA2012/070799, mailed Apr. 30, 2013, pp. 1-10.

J. Guajardo et al., "Physical Unclonable Functions and Public-Key Crypto for FPGA IP Protection," Copyright 2007 IEEE, pp. 187-195.

J. Li et al., "At-Speed Delay Characterizations for IC Authentication and Trojan Horse Detection," 2008 IEEE International Workshop on Hardware-Oriented Security and Trust, Anaheim, CA, Jun. 9, 2008, pp. 1-7.

K. Lofstrom et al., "IC Identification Circuit Using Device Mismatch," 2000 IEEE International Solid-State Circuits Conference, Copyright 2000 IEEE, pp. 1-2.

S. Maeda et al., "An Artificial Fingerprint Device (AFD): A Study of Identification Number Applications Utilizing Characteristics Variation of Polycrystalline Silicon TFTs," IEEE Transactions on Electron Devices, vol. 50, No. 6, Jun. 2003, Copyright 2003.

S. S. Kumar et al., "Extended Abstract: The Butterfly PUF Protecting IP on Every FPGA," 2008 IEEE International Workshop on Hardware-Oriented Security and Trust, Anaheim, CA, Jun. 9, 2008.

Y. Alkabani et al., "Trusted Integrated Circuits: A Nondestructive Hidden Characteristics Extraction Approach," IH 2008, LNCS 5284, pp. 102-117, 2008; Copyright Springer-Verlag Berlin Heidelberg 2008.

Y. Su et al., "A 1.6pJ/bit 96% Stable Chip-ID Generating Circuit Using Process Variations," 2007 IEEE International Solid-State Circuits Conference, Copyright 2007 IEEE, pp. 406-407, 611.

* cited by examiner

PHYSICAL UNCLONABLE INTERCONNECT FUNCTION ARRAY

DOMESTIC PRIORITY

This application is a divisional of U.S. patent application Ser. No. 13/414,825, filed Mar. 8, 2012, the disclosure of which is incorporated by reference herein in its entirety.

BACKGROUND

The present invention relates to unclonable functions, and more specifically, to physical unclonable functions.

A physical unclonable function (PUF) is a function that is arranged in a physical structure that is typically easily evaluated, but difficult to predict. A PUF device should be very difficult to duplicate, but relatively simple to fabricate.

A PUF generates a set of bits, for example, 128 bits to form a matrix A. During operation the calculation $Y=A*X$ is performed, where A is a matrix having elements generated from the PUF, X is an input vector called a "challenge," and Y is the output vector called the "response."

The matrix A and the input vector should only be known to the chip owner such that only the owner may know if the response is correct.

Typical PUF characteristics include stable bit generation from the PUF that remain fixed over time, and correlation among the bits generated from similar PUF structures should be random.

SUMMARY

According to one embodiment of the present invention, a method for fabricating an interconnect function array includes forming a first plurality of conductive lines on a substrate, forming an insulator layer over the first plurality of conductive lines and the substrate, removing portions of the insulator layer to define cavities in the insulator layer that expose portions of the substrate and the first plurality of conductive lines, wherein the removal of the portions of the insulator layer results in a substantially random arrangement of cavities exposing portions of the substrate and the first plurality of conductive lines, depositing a conductive material in the cavities, and forming a second plurality of conductive lines on portions of the conductive material in the cavities and the insulator layer.

According to another embodiment of the present invention, a method for fabricating an interconnect function array includes forming a first plurality of conductive lines on a substrate, forming an insulator layer over the first plurality of conductive lines and the substrate, removing portions of the insulator layer to define cavities in the insulator layer, wherein the removal of the portions of the insulator layer results in a substantially random arrangement of cavities exposing portions of the substrate and the first plurality of conductive lines, depositing a dielectric layer over the insulator layer and the cavities, and forming a second plurality of conductive lines on the dielectric layer.

According to yet another embodiment of the present invention, an interconnect array includes a first plurality of conductive lines arranged on a substrate, an insulator layer disposed on the first plurality of conductive lines, a second plurality of conductive lines arranged on the insulator layer, wherein portions of the second plurality of conductive lines overlap portions of the first plurality of conductive lines, and a plurality of via cavities defined by the insulator layer, the plurality of via cavities arranged in a random pattern.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIGS. 5A-11B illustrate an exemplary fabrication method for an array similar to the array of FIG. 2, in this regard:

FIGS. 12A-15B illustrate an exemplary method for fabricating an array similar to the array of FIG. 2 where the vias define a capacitive coupling, in this regard:

DETAILED DESCRIPTION

Many PUF systems include active devices that may be distorted by operating conditions such as voltage, temperature, or sensing circuitry. The embodiments and methods described below, offer a PUF system that uses arrangements of passive or non-volatile features to define a PUF array.

Figure 1:
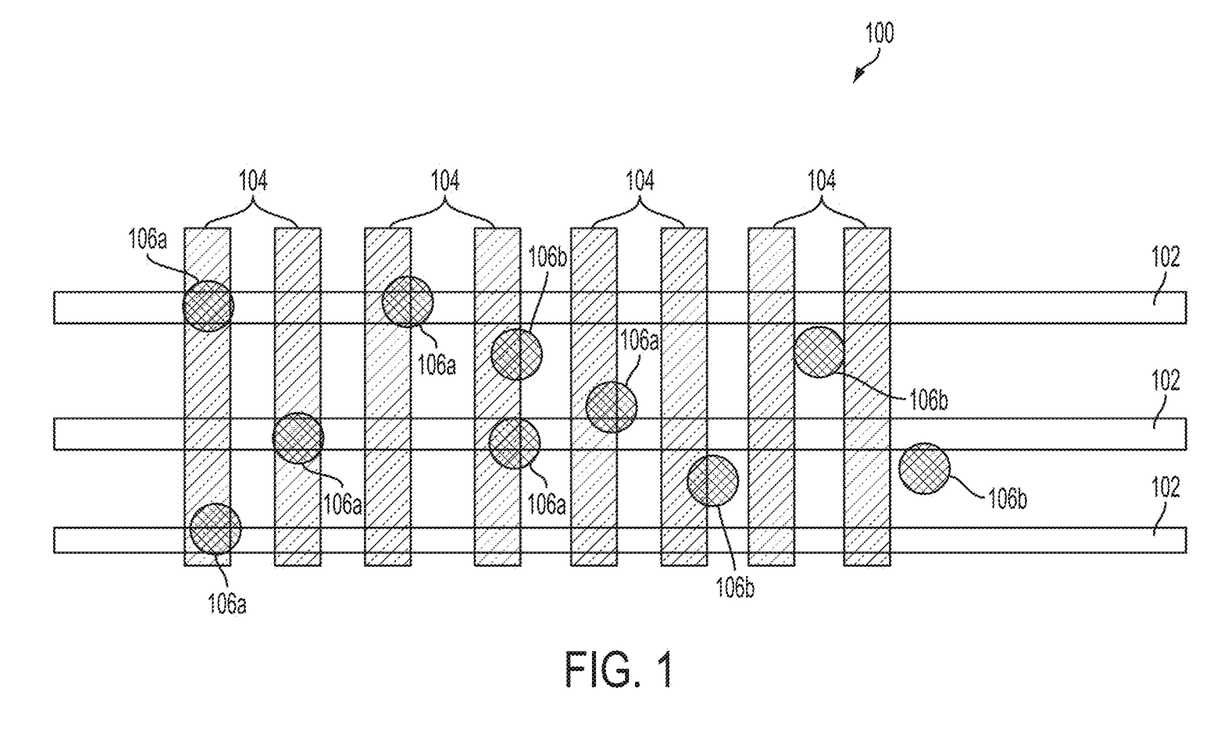
FIG. 1 illustrates top view of an exemplary embodiment of array of conductive features that are arranged on a substrate of a wafer.

In this regard, FIG. 1 illustrates top view of an exemplary embodiment of an array 100 of conductive features that are arranged on a substrate of a chip or wafer. The array 100 includes a first set of conductive lines 102 that are arranged on a first level (M1) of the wafer and a second set of conductive lines 104 that are arranged on a second level (M2) of the wafer. One or more insulator layers (not shown) may be disposed between the first level and the second level such that the conductive lines 102 and the conductive lines 104 are not in contact. An arrangement of vias 106 are randomly patterned in the array 100. The vias 106 are patterned in the insulator layer(s). The vias 106 may be filled with a conductive material or a dielectric material such as, for example, air. The vias 106a that contact both a conductive line 102 and a conductive line 104 result in an electrical connection (for embodiments having vias 106 filled with a conductive material) or a capacitive coupling (for embodiments having vias 106 filled with a dielectric material), while vias 106b that only contact either one of the conductive lines 102 or 104, or vias 106b that do not contact either one of the conductive lines 102 and 104 do not result in an electrical connection or capacitive coupling. Thus, if the vias 106 are patterned using a method that results in a substantially random pattern, distribution, and number of vias 106, the resultant locations of the electrical connections or capacitive couplings is likewise substantially random.

Figure 2:
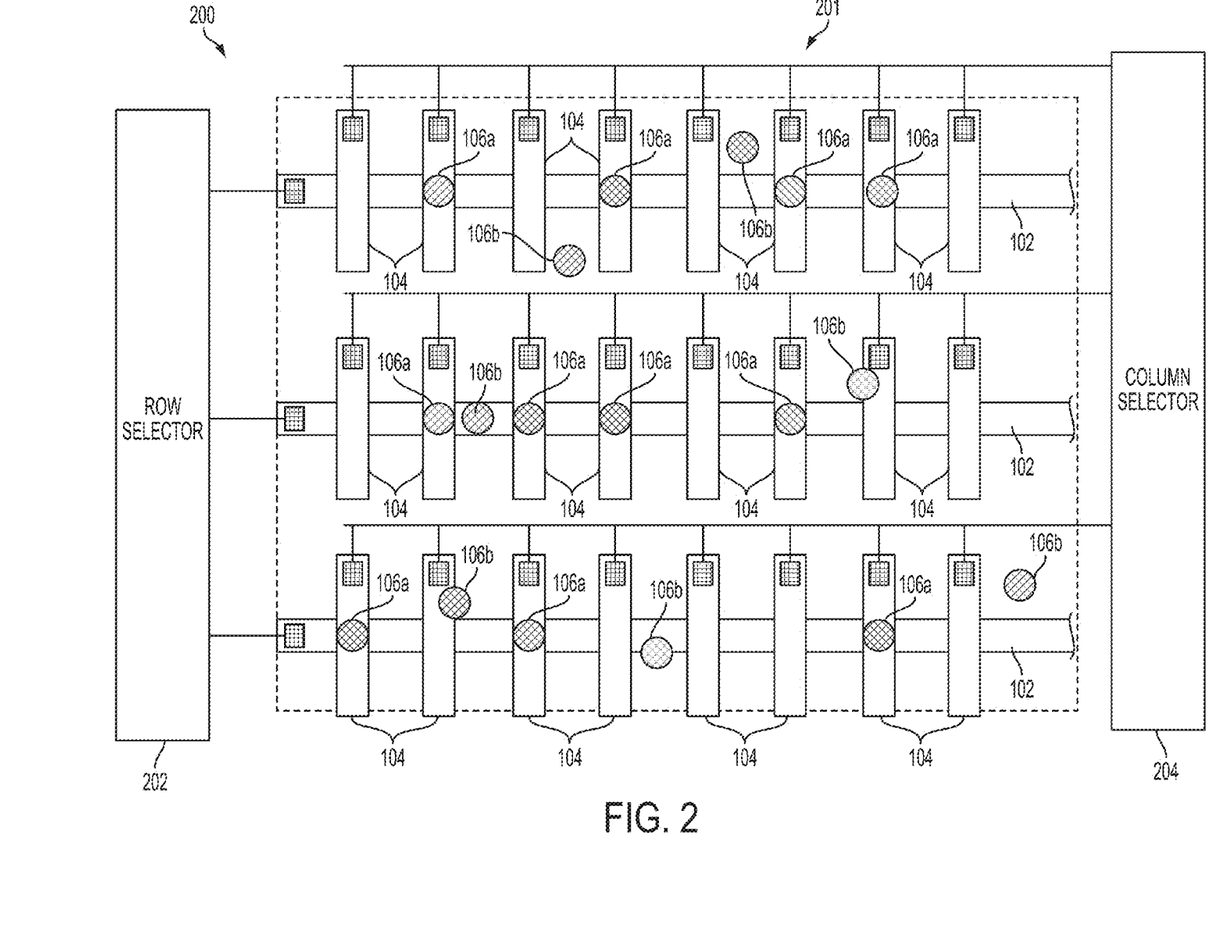
FIG. 2 illustrates a top view of an exemplary embodiment of PUF system that includes an array that is similar to the array of FIG. 1.

FIG. 2 illustrates a top view of an exemplary embodiment of PUF system 200 that includes an array 201 that is similar to the array 100 (of FIG. 1). In the illustrated embodiment each of the conductive lines 102 are connected to a row selector portion 202, and each of the conductive lines 104 are connected to a column selector portion 204. The vias 106 are arranged in a random pattern. The vias 106a result in a conductive electrical connection or a capacitive coupling in a similar manner as described above, while vias 106b that only contact either one of the conductive lines 102 or 104, or vias 106b that do not contact either one of the conductive lines 102 and 104 do not result in an electrical connection or capacitive coupling.

Embodiments of the array 200 may include vias 106 that are all filled with either a conductive material or a dielectric material. Alternatively, some exemplary embodiments may include some vias that are filled with a conductive material and some vias that are filled with a dielectric material. In an array with both conductive filled vias and dielectric filled vias, the distribution of the respective types of vias may also be random.

Figure 3:
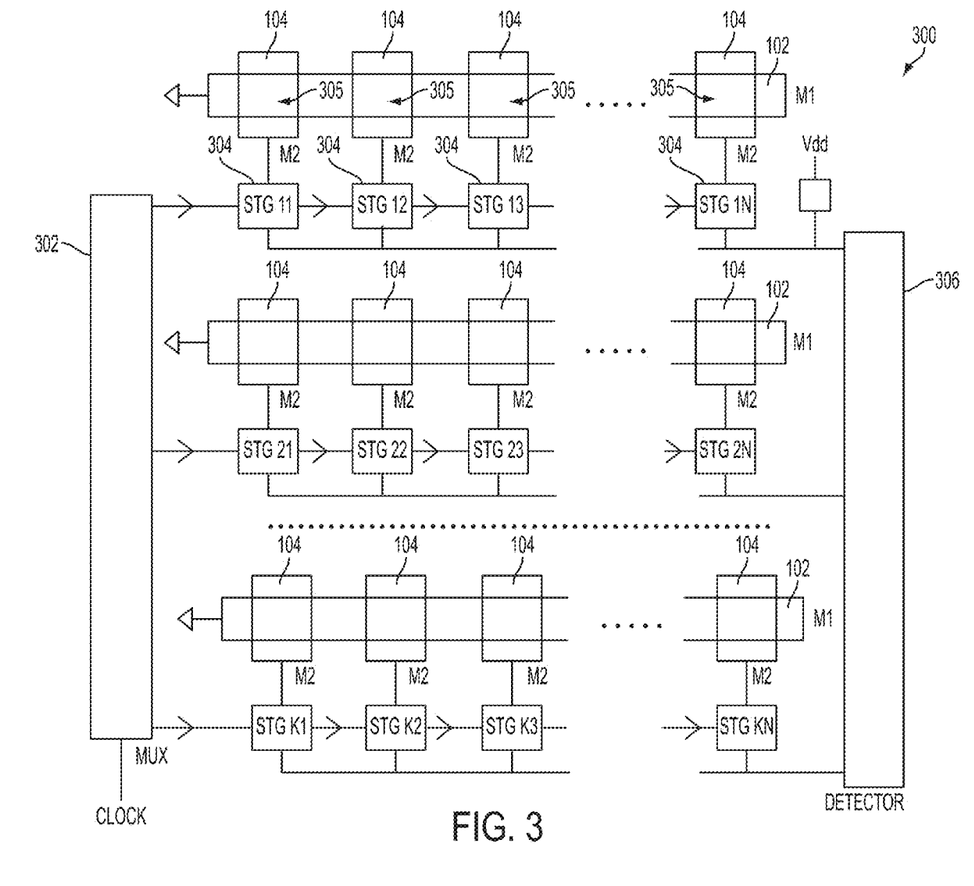
FIG. 3 illustrates a block diagram of an exemplary embodiment of a system.

FIG. 3 illustrates a block diagram of an exemplary embodiment of a system 300 that is operative to detect the electrically conductive connections between the lines 102 and the lines 104 defined by the vias 106a (not shown) that are filled with a conductive material. In this regard, the system 300 includes a multiplexor (MUX) 302 that receives a clock signal. The MUX 302 is connected to shift register based transmission gates 304 that are connected to the lines 104. A voltage Vdd is applied to the array via the gates 304. The detector portion 306 is operative to detect the resultant voltage difference due to the conductive connections between lines 102 and 104 defined by the vias 106a. In operation, the system 300 may logically determine whether each overlap 305 of the lines 102 and 104 are connected or not connected with a via 106a. In such a scheme, each overlap 305, may represent a bit such that an overlap 305 that is detected as not connected by a via 106a results in a logical 0 while an overlap that is detected as connected by a via results in a logical 1. If in fabrication, the pattern of vias 106 is substantially randomly patterned and defined, the resultant detected bits will be substantially random, resulting in a random binary number having a number of bits corresponding to the number of overlaps 305. Embodiments may include any number of overlaps 305 defined by the lines 102 and 104.

Figure 4A:
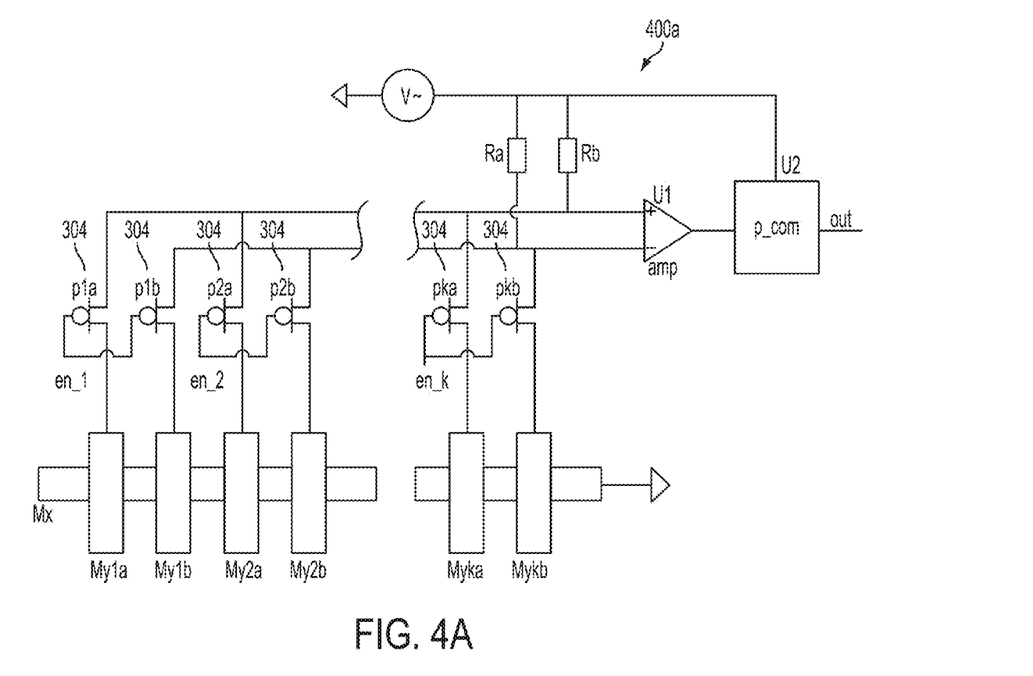
FIGS. 4A and 4B illustrates circuits diagrams of an exemplary embodiment of a circuit that may be used in a similar manner to detect a capacitive coupling.
Figure 4B:
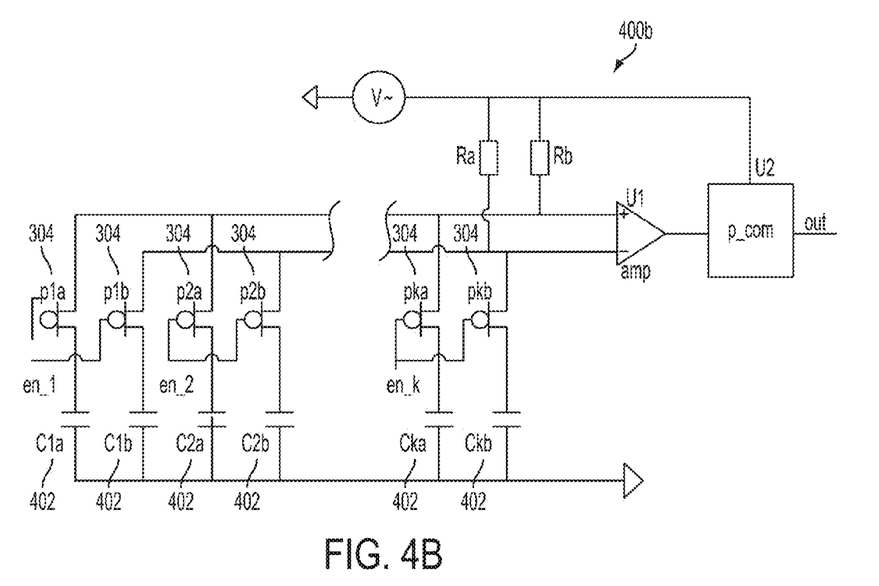

FIGS. 4A and 4B illustrate a circuit diagram of an exemplary embodiment of a circuit 400 that may be used in a similar manner to detect a capacitive coupling. In FIG. 4A, Mx and My are metal layers, for example Mx is M1 and My is M2. The k pairs of My segments, which are similar in their design values, form k pairs of capacitors with grounded segments of Mx as shown in FIG. 4B. Due to random arrangement of the vias 106 filled with a dielectric material for capacitive coupling, the capacitances of the two capacitors in each pair are varied randomly. In this regard, the capacitors 402 represent the vias 106a. A voltage may be applied to the lines 102 via shift register based transmission gates 304 that are connected to a MUX 302 (as shown in FIG. 3) The circuit 400 operates in a similar manner as the embodiment of FIG. 3, but senses capacitive couplings at the overlaps 305 rather than conductive electrical connections. In this case, as shown in FIG. 4, Ra and Rb are commonly shared resistors, U1 is a deferential input, single-ended output amplifier, and U2 is a phase comparator. V~ is an AC voltage source with a DC bias.

Figure 5A:
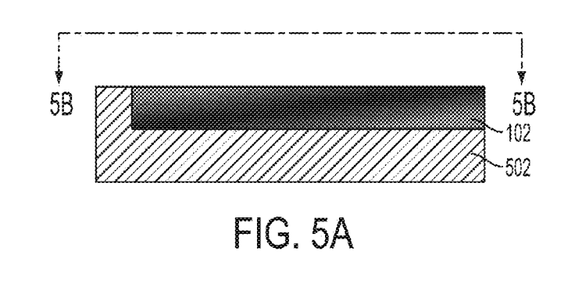
FIGS. 5A and 5B illustrate a side cut-away view and a top view respectively of conductive lines in a substrate.
Figure 5B:
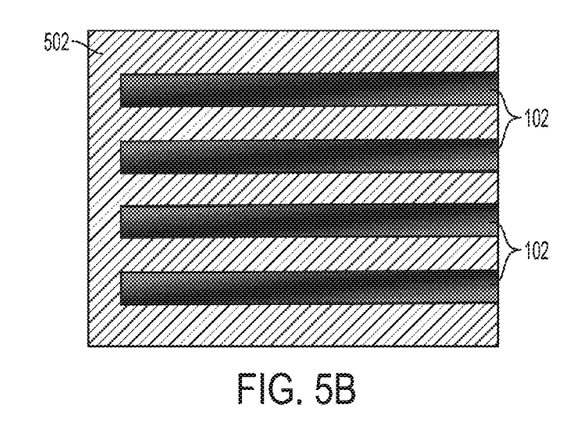

FIGS. 5A-11B illustrate an exemplary fabrication method for an array similar to the array 200 (of FIG. 2) described above, where the vias 106 are filled with a conductive material. In this regard, FIGS. 5A and 5B illustrate a side cut-away view and a top view respectively of conductive lines 102 that have been patterned in a substrate 502. The conductive lines 102 may be formed by any suitable deposition and patterning methods such as, for example, a chemical vapor deposition (CVD) or plasma enhanced chemical vapor deposition (PECVD) process followed by a lithographic patterning and etching process that forms the conductive lines 102. Alternatively, trenches may be etched in the substrate using a lithographic patterning and etching process followed by the deposition of a conductive material. A planarizing process, such as, a chemical mechanical polishing (CMP) process may be performed to define the conductive lines 102.

Figure 6A:
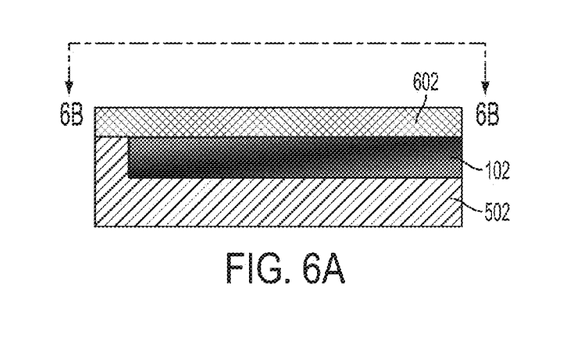
FIGS. 6A and 6B illustrate the deposition of an insulator layer.
Figure 6B:
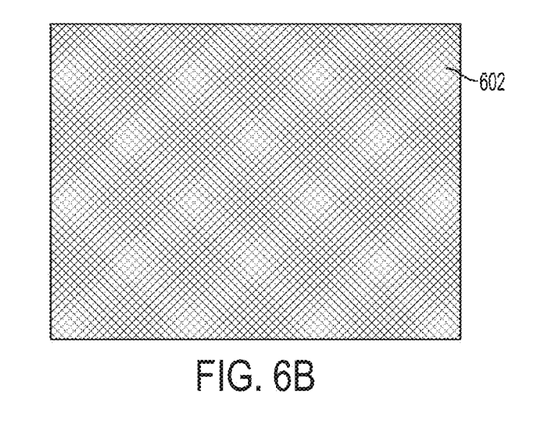

FIGS. 6A and 6B illustrate, in a side view and top view respectively, the deposition of an insulator layer 602 that may include, for example, a dielectric material such as, for example, an oxide or nitride material. The insulator layer 602 is disposed over the substrate 502 and the conductive lines 102.

Figure 7A:
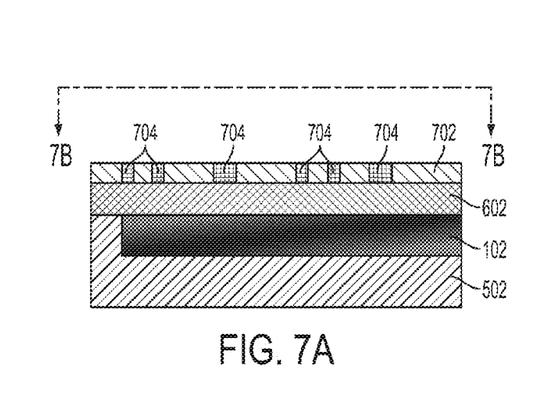
FIGS. 7A and 7B illustrate the deposition and patterning of a photolithographic resist material.
Figure 7B:
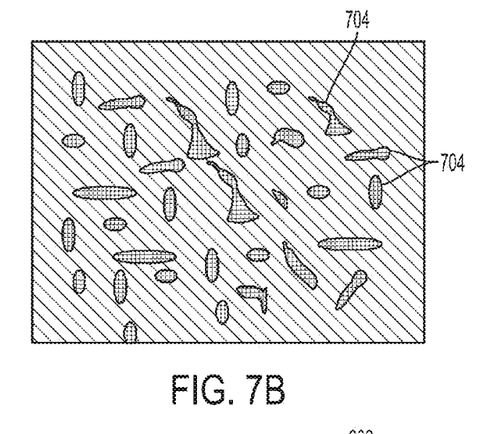

FIGS. 7A and 7B illustrate, in a side view and top view respectively, the deposition and patterning of a photolithographic resist material 702 over the insulator layer 602. The resist material 702 may include, for example, a copolymer that when formed and patterned results in a random lithographic pattern of cavities 704 in the resist material 702 that expose portions of the insulator layer 602. The copolymer may include a Diblock (PMMA-PS) material. The dimensions of the cavities 704 may be adjusted by the copolymer formulation, and the density and randomness of the pattern of cavities 704 may be modified by an added impurity. Alternatively, a polymer that includes Si particles may be used to form the resist material 702, where the dimensions of the cavities 704 may be determined by the size of the Si particles. The methods described above for forming and patterning the resist material 702 are mere examples. Any suitable method that results in the formation of a resist material 702 having a pattern of substantially random cavities 704 may be used.

Figure 8A:
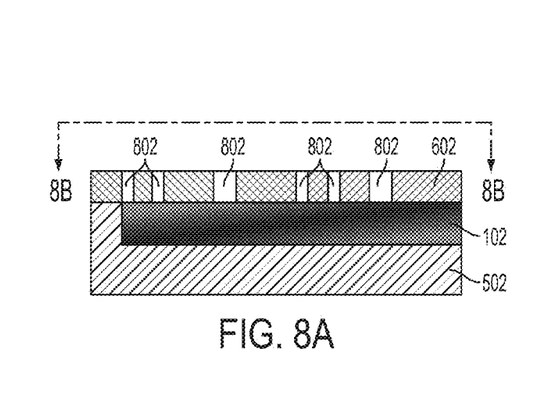
FIGS. 8A and 8B illustrate the resultant structure following the removal of exposed portions of the insulator layer.
Figure 8B:
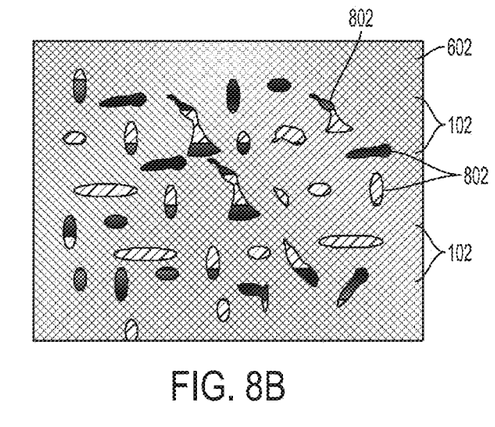

FIGS. 8A and 8B illustrate, in a side view and top view respectively, the resultant structure following the removal of exposed portions of the insulator layer 602 that exposes portions of the lines 102 and the substrate 502 using an etching process such as, for example, reactive ion etching (RIE) or another suitable wet or dry etching process. The removal of the exposed portions of the insulator layer 602 defines vias 802 in the insulator layer 602. Following the formation of the vias 802, the resist material 702 (of FIG. 7) may be removed. Thus, the resultant structure includes vias 802 that are arranged in a substantially random manner corresponding to the cavities 704 of the resist material 702.

Figure 9A:
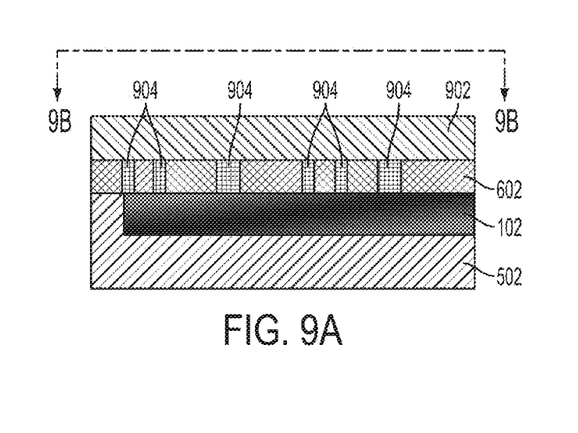
FIGS. 9A and 9B illustrate the resultant structure following the deposition of a conductive material in the vias.
Figure 9B:
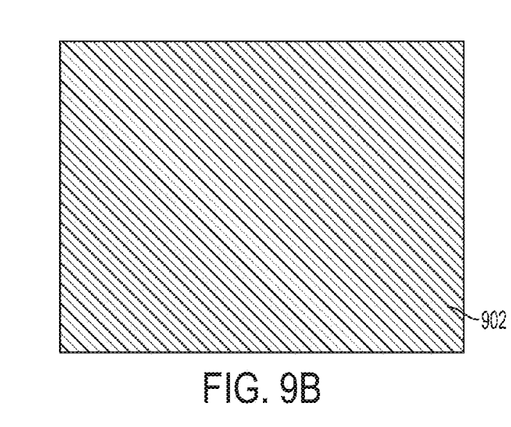

FIGS. 9A and 9B illustrate, in a side view and top view respectively, the resultant structure following the deposition of a conductive material 904 in the vias 802. The conductive material 904 may be deposed by, for example, a CVD or PECVD process that fills the vias 802 with the conductive material. Following the deposition of the conductive material, overburden of the material may be removed from the surface 901 of the dielectric layer 902 with, for example, a planarizing process. Following the formation of the conductive material 904, an insulator material (dielectric material) 902 may be formed over the dielectric layer 902 and over the conductive material 904 in the vias 802.

Figure 10A:
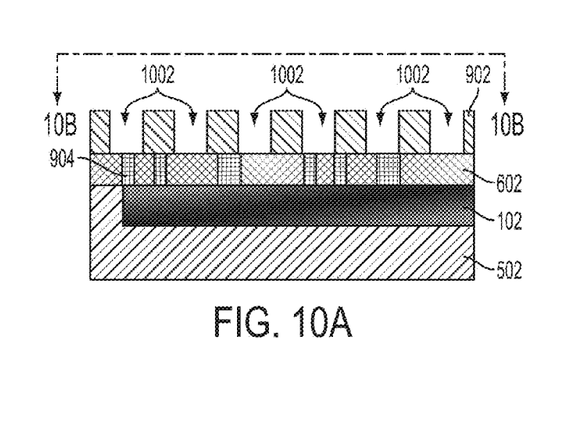
FIGS. 10A and 10B illustrate the resultant structure following the patterning and etching of the dielectric material.
Figure 10B:
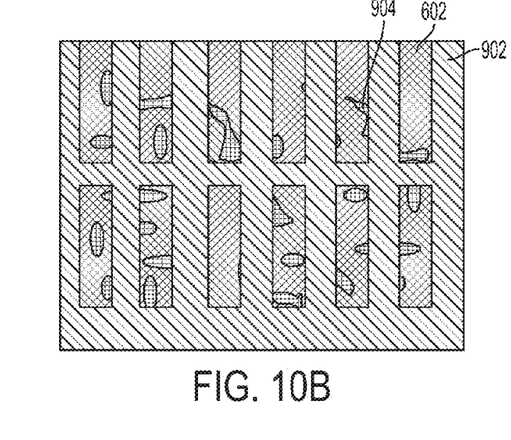

FIGS. 10A and 10B illustrate, in a side view and top view respectively, the resultant structure following the patterning and etching of the dielectric material 902 that removes portions of the dielectric material 902 and exposes portions of the insulator layer 602 and the conductive material 904 in the vias 802 using a suitable lithographic patterning and etching process.

Figure 11A:
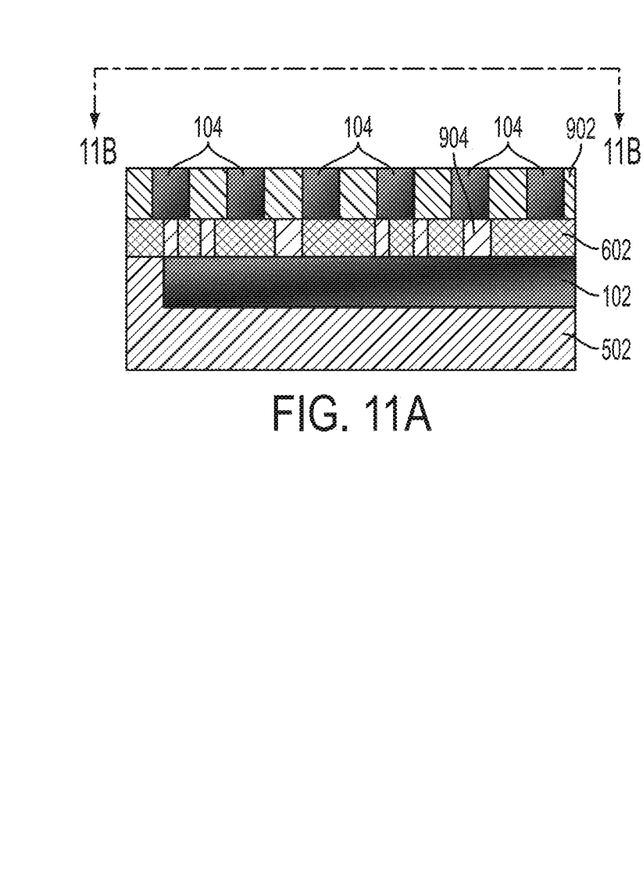
FIGS. 11A and 11B illustrate the resultant structure following the deposition of a conductive material over exposed portions of the insulator layer.
Figure 11B:
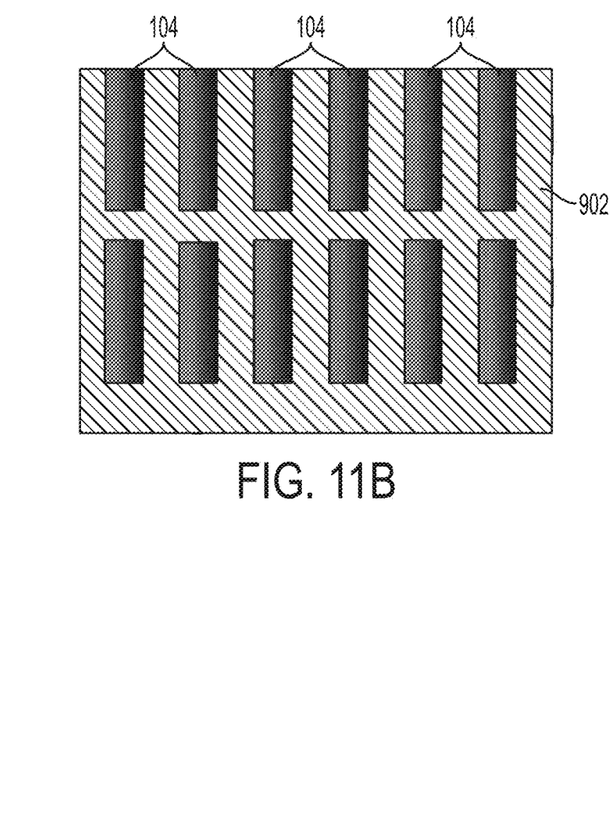

FIGS. 11A and 11B illustrate, in a side view and top view respectively, the resultant structure following the deposition of a conductive material over exposed portions of the insulator layer 602 and the conductive material 904 in the vias 802 using, for example, a CVD or PECVD process. Following the deposition of the conductive material, the overburden of the conductive material may be removed by, for example, a planarization process that defines the lines 104. The resultant structure includes an array similar to the array 200 of FIG. 2 having lines 102 and 104 defining overlapping regions 305 (described above) and a substantially random pattern of conductive vias 802 that define a substantially random arrangement of connections between the lines 102 and 104.

Figure 12A:
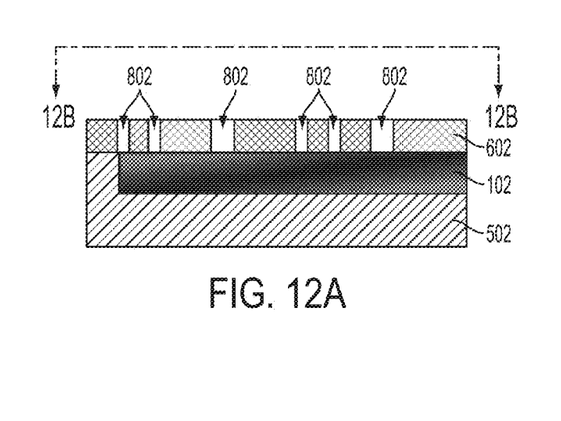
FIGS. 12A and 12B illustrate the resultant structure as described above in FIGS. 8A and 8B.
Figure 12B:
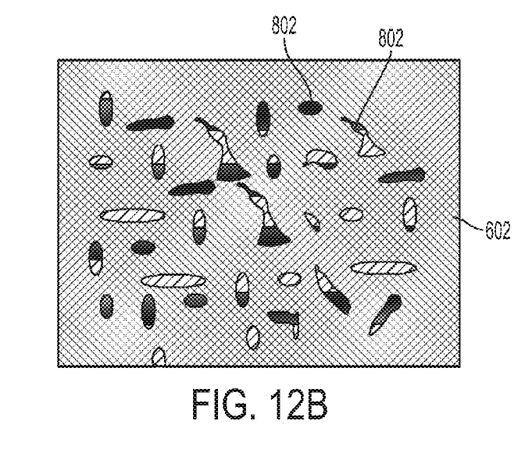

FIGS. 12A-15B illustrate an exemplary method for fabricating an array similar to the array 200 (of FIG. 2) where the vias 106b define a capacitive coupling between the overlapping region 305 (of FIG. 3) of the lines 102 and 104. In this regard, the exemplary method is similar to the process described above in FIGS. 5A-8B. FIGS. 12A and 12B illustrate, in a side view and top view respectively, the resultant structure as described above in FIGS. 8A and 8B.

Figure 13A:
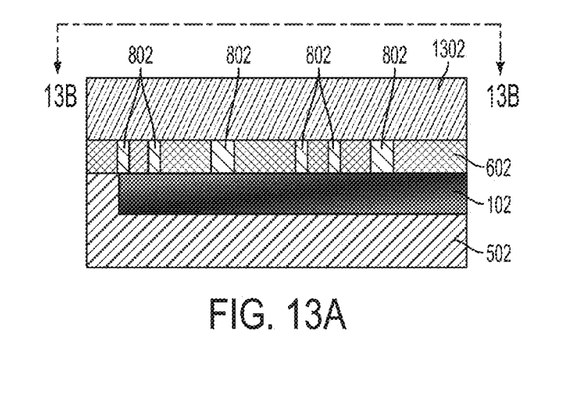
FIGS. 13A and 13B illustrate the formation of an insulator layer.
Figure 13B:
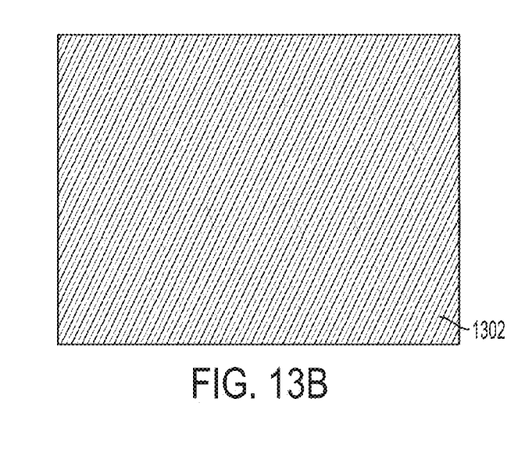

FIGS. 13A and 13B illustrate, in a side view and top view respectively, the formation of an insulator layer (dielectric layer) 1302 over the insulator layer 602 and the vias 802. In the illustrated embodiment the vias 802 are filled with air, however in alternate embodiments, alternative dielectric materials may be used by, for example, a CVD, PECVD, or spin-on process.

Figure 14A:
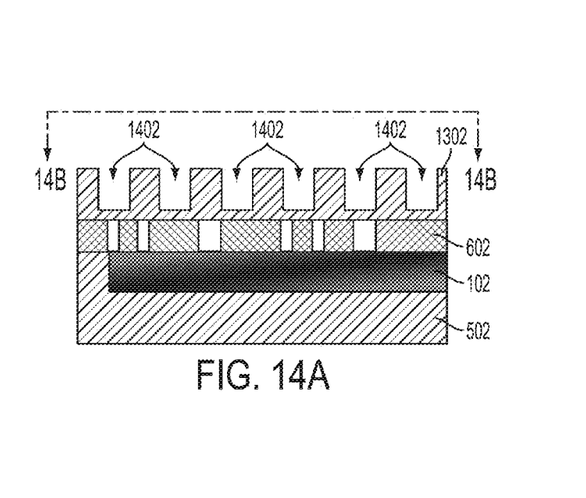
FIGS. 14A and 14B illustrate the patterning of the dielectric layer.
Figure 14B:
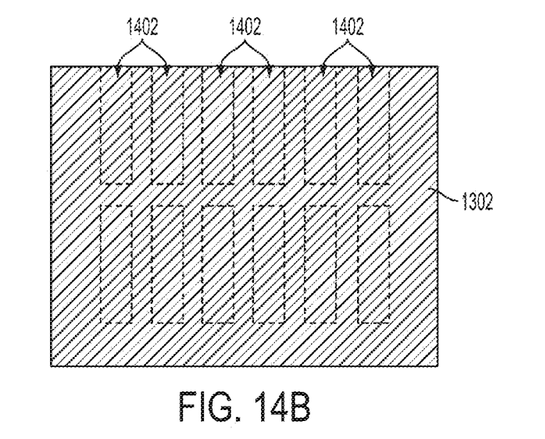

FIGS. 14A and 14B illustrate, in a side view and top view respectively, the patterning of the dielectric layer 1302 using a suitable patterning and etching process that removes portions of the dielectric layer 1302 to define the cavities 1402 in the dielectric layer 1302.

Figure 15A:
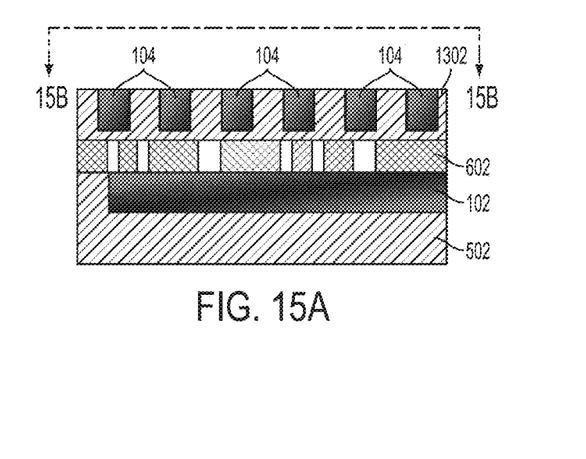
FIGS. 15A and 15B illustrate the resultant structure following the deposition of a conductive material in the cavities.
Figure 15B:
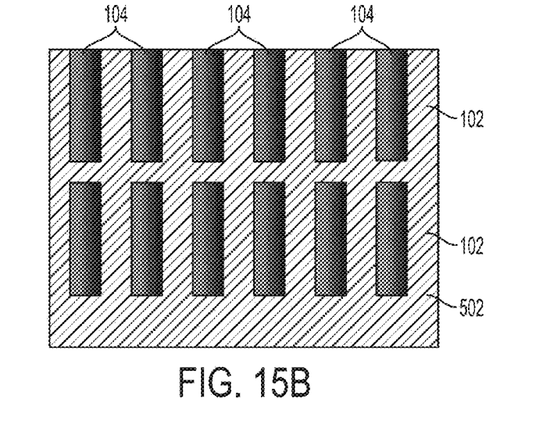

FIGS. 15A and 15B illustrate, in a side view and top view respectively, the resultant structure following the deposition of a conductive material in the cavities 1402 (of FIG. 14) resulting in the formation of the lines 104 in a similar manner as described above in FIG. 11. The FIG. 15B is a partially transparent top view of FIG. 15A along the line 15B of FIG. 15A where the insulator layer 602 and the dielectric layer 1302 are transparent.

The systems and methods described above provide an array that may be used to generate bits in a PUF system that may be efficiently fabricated. The fabrication method may be repeated for any number of chips; however each chip will have a different PUF array and resultant output bits due to the random pattern of vias that will be unique to each array. In an embodiment, the array does not include active devices, and thus is not appreciably affected by, for example, environmental changes such as temperature or voltage variation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

As used herein, the term "module" refers to an application specific integrated circuit (ASIC), an electronic circuit, an electronic computer processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An interconnect array comprising:
   a first plurality of conductive lines arranged in a substrate, the first plurality of conductive lines extending along a first direction to define respective rows;
   an insulator layer disposed on the first plurality of conductive lines;
   a second plurality of conductive lines arranged in the insulator layer, the second plurality of conductive lines extending along a second direction perpendicular to the first direction to define respective columns, wherein portions of the second plurality of conductive lines overlap portions of the first plurality of conductive lines; and
   a plurality of vias defined by the insulator layer, the plurality of vias arranged in a random pattern, the plurality of vias include at least one connected via and at least one disconnected via, the at least one connected via contacting at least one of the first plurality of conductive lines and the second conductive lines, and the at least one disconnected via that does not contact the first plurality of conductive lines and the second conductive lines.

2. The array of claim 1, wherein the vias are filled with a dielectric material.

3. The array of claim 1, wherein the vias are filled with a conductive material.

* * * * *